United States Patent [19]

Kurozu et al.

[11] 4,067,611

[45] Jan. 10, 1978

[54] SEAT LOCK DEVICE

[75] Inventors: Toshio Kurozu, Chigasaki; Norio Miyashita, Tokyo, both of Japan

[73] Assignees: Mitsui Mining & Smelting Co., Ltd.; Honda Motor Co., Ltd., both of Tokyo, Japan

[21] Appl. No.: 772,594

[22] Filed: Feb. 28, 1977

[30] Foreign Application Priority Data

Mar. 5, 1976 Japan .................................. 51-23928

[51] Int. Cl.² .............................................. A47C 1/024
[52] U.S. Cl. .................................... 297/355; 297/367; 297/379
[58] Field of Search ................ 297/355, 379, 367–369, 297/354, 378, 328; 296/65 R, 66, 69

[56] References Cited

U.S. PATENT DOCUMENTS

| 425,778 | 4/1890 | Goetel | 297/367 |
|---|---|---|---|
| 3,262,725 | 7/1966 | Ballantyne | 297/379 X |
| 3,410,600 | 11/1968 | Thorpe | 297/379 X |
| 3,784,252 | 1/1974 | Peterson | 297/355 X |

Primary Examiner—Roy D. Frazier
Assistant Examiner—William E. Lyddane
Attorney, Agent, or Firm—Flynn & Frishauf

[57] ABSTRACT

A seat lock device comprising a lock units provided on the side of a seat and at a point spaced from the pivotal shaft of the back rest and a plurality of strikers erected on an immovable member for engagement with the lock unit, wherein when any of the strikers is moved in engagement with any of elongate grooves cut out in a rotatable actuating unit pivotally supported by the lock unit and the actuating unit is rotated by a predetermined angle, a latch is inserted into any of the elongate grooves to lock said actuating unit, consequently said back rest, on the striker, and where a connector is pulled, the back rest is unlocked and can be shifted to another striker to be locked thereby.

6 Claims, 9 Drawing Figures

FIG. 5
FIG. 6
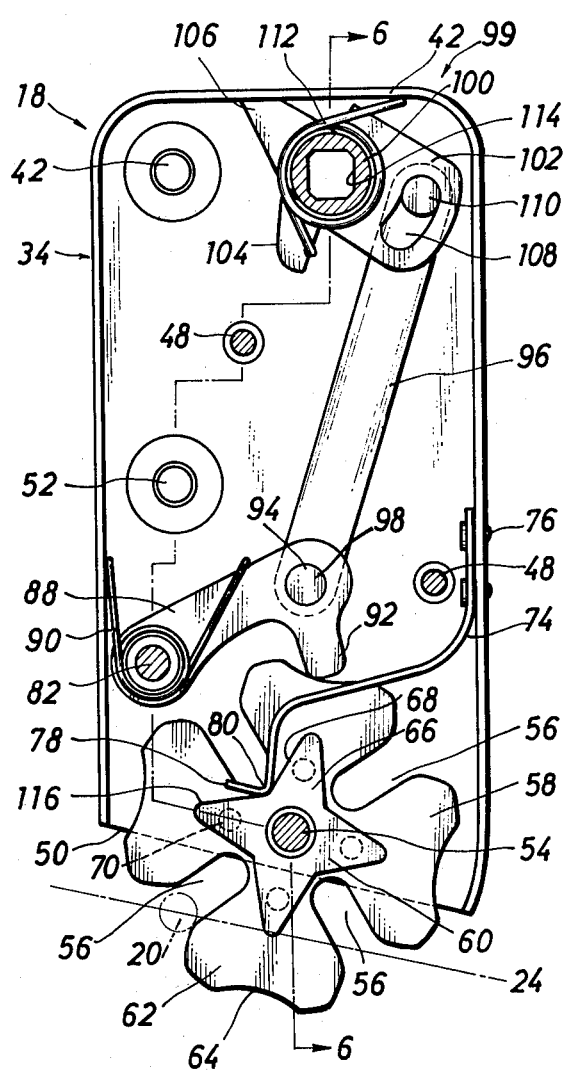
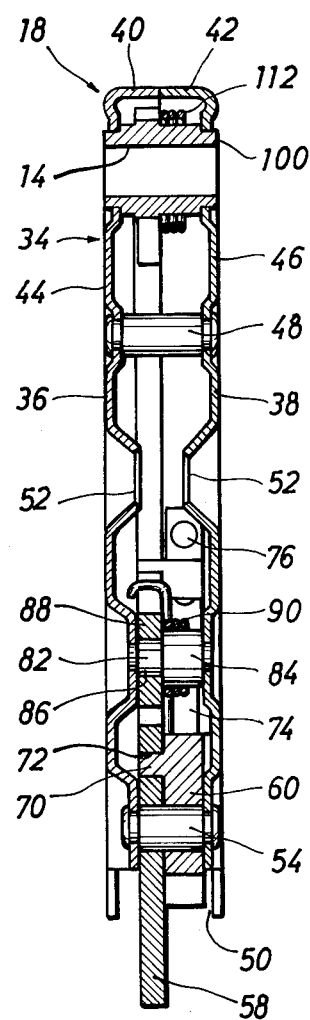

SEAT LOCK DEVICE

BACKGROUND OF THE INVENTION

This invention relates to a seat lock device for locking by stages in an inclined position a swingable member or a back rest of a seat rotatably supported on a pivotal shaft mounted on an immovable member.

The above-mentioned type of seat lock device has been used in the past. The prior art seat lock device comprises, for example, a ratchet and pawl positioned very close to the pivotal shaft about which the back rest of the seat is swung, and consequently is accompanied with the drawbacks that where the back rest of the seat is suddenly locked or is subjected to an external force, the seat lock device undergoes a great stress possibly to be damaged, making it necessary to construct said seat lock device with very great mechanical strength.

To eliminate the above-mentioned difficulties, another seat lock device has been devised which is designed to lock the swingable back rest of a seat at a point apart from the pivotal shaft of the seat. However, the proposed seat lock device has failed to meet a demand for a type of simple construction which enables the back rest of a seat to be inclined in a large number of stages. With, for example, a light van type automobile which is provided with a cargo section behind a rear seat, the back rest of the rear seat is made to swing back and forth. Hitherto, however, the back rest can take only two positions, that is, a slightly reclined normal position adapted for a rider to be seated thereon and a substantially horizontal forward thrown position to enlarge a cargo space. Therefore, the conventional seat lock device has the drawbacks that even where a required amount of cargo can be carried simply by locking the back rest of a rear seat in an upright position, the back rest has to be thrown forward in a substantially flat position due to the original design, preventing a rider to be seated on the rear seat. Further, where a small amount of cargo has only to be carried, the rider cannot be more comfortably seated on the rear seat by reclining the back rest thereof slightly backward from the normal position.

SUMMARY OF THE INVENTION

It is according the object of this invention to provide a seat lock device which enables the swingable back rest of a rear seat to be locked in an inclined position in a large number of stages without being subjected to any unduly large stress.

To attain the above-mentioned object, this invention provides a seat lock device comprising a lock unit fitted on one member of a immovable member and a swingable member or back rest of a seat rotatably supported by a pivotal shaft mounted on the immovable member and at a point spaced from the pivotal shaft, and a plurality of strikes erected on the other member along the circumference of a circle centered at the pivotal shaft for lockable engagement with the lock unit, wherein the lock unit includes a case; an actuating unit pivotally supported on the case to be rotated in engagement with the strikers; a lock mechanism for locking the rotatable actuating unit when it is rotated through a prescribed angle to a lock position; a direction-setting unit for rotating the actuating unit to set it in a free position ready for engagement with the approaching striker where said actuating unit remains disengaged from the striker; and a releasing mechanism for releasing the actuating unit locked by the lock mechanism.

The seat lock device of this invention in which the lock unit and strikers are spaced from the pivotal shaft of a back rest has the advantages that a relatively small force generally has only to be applied to the lock unit and strikers, rendering said lock unit and strikers little subject to damage; the seat lock device as a whole can be made compact light, durable and inexpensive; and a large number of strikers can be provided, enabling the back rest of a seat to be locked in an inclined position in a large number of stages.

With a lock unit according to a preferred embodiment of this invention, the actuating unit has a plurality of elongate grooves radially cut out and equidistantly arranged in the circumferential direction. Where the actuating unit is rotated in engagement with any of the strikers through a prescribed angle to a lock position, a latch is inserted into any of the elongate grooves, thereby locking the striker with the lock unit. As the result, the swingable back rest of a seat is fixed in a position corresponding to the locked striker.

The free position of the actuating unit is reached when the equidistantly arranged projections of the star-shaped member are pushed by suitable elastic means. Where the projections of the star-shaped members are pushed by the elastic means while the striker remains disengaged from any of the elongate grooves, then the star-shaped member is rotated to be set at a position in which the elastic means is engaged with any of the root portions lying between every two adjacent triangular projections, namely, a stable position. The actuating unit is so fitted to the star-shaped member that at this time said actuating unit can be rotated to a free position ready for engagement with the approaching striker. The star-shaped member has the same number of stable positions and the actuating unit has the same number of free positions as the angles defined by every two root portions lying between the respective adjacent triangular projections with the common pivotal shaft of said star-shaped member and actuating unit. Each time the lock unit passes one of the strikers, the rotatable actuating unit and star-shaped member are rotated through one of the above-defined angles in a direction determined by the direction of the passage of the lock unit. This rotation is continued, until the actuating unit is set at the adjacent free position and the star-shaped member is held at the adjacent stable position.

BRIEF DESCRIPTION OF THE DRAWINGS

FIG. 5 is a front view showing the interior of a lock unit according to one embodiment of the invention;

FIG. 6 is a lateral sectional view on line I—I of the lock unit of FIG. 5;

DESCRIPTION OF THE PREFERRED EMBODIMENTS

Figure 1:
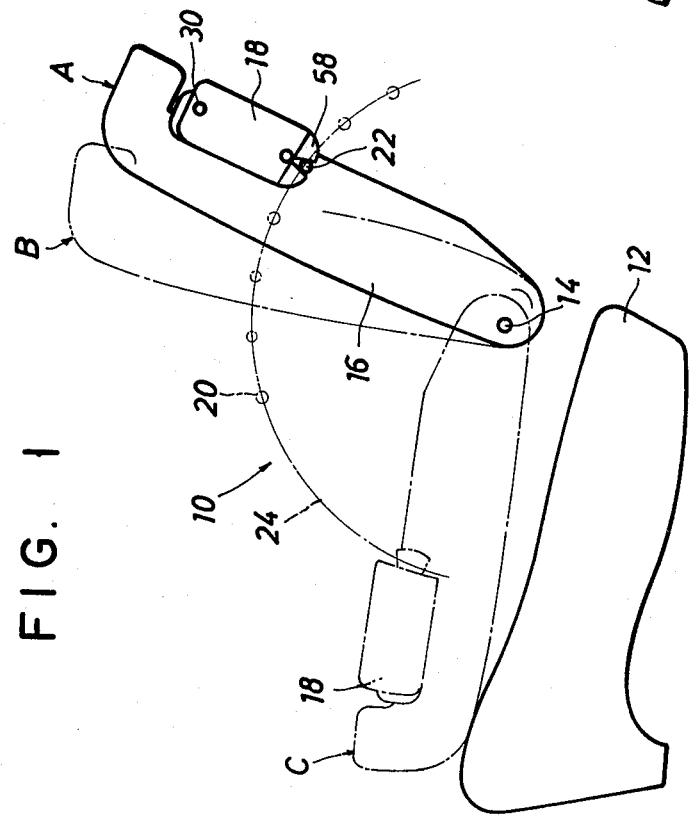
FIG. 1 is a side elevation of a seat lock device embodying this invention which is applied to a back rest of a rear seat.
Figure 2:
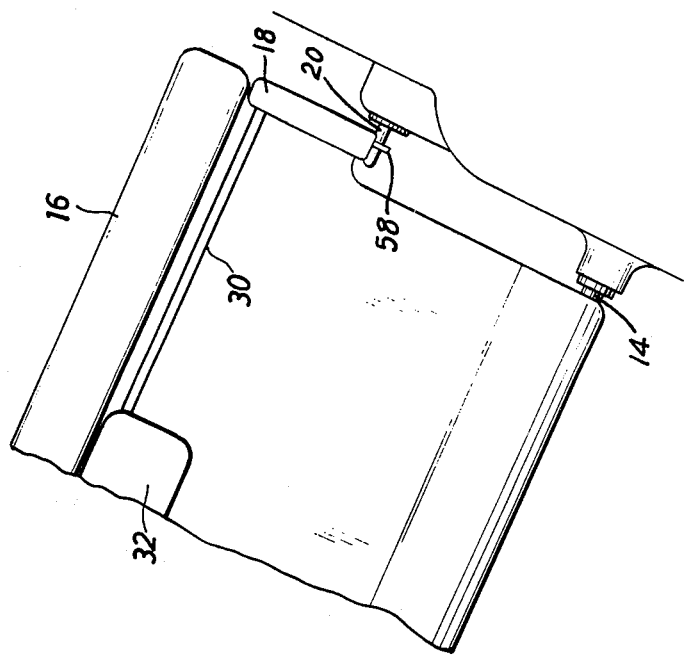
FIG. 2 is a back view of the back rest of the rear seat of FIG. 1.

There will now be described by reference to FIGS. 1 to 8 a seat lock device according to one embodiment of this invention which is applied to a back rest of a rear seat of a light van type automobile. Referring to FIGS. 1 and 2, a rear seat 10 is supported by a seating section 12 and a pivotal shaft 14 and comprises a back rest 16 which can be thrown forward and rearward of the light van type automobile. A pair of lock units 18 of symmetric construction are fitted to both lateral sides of the back rest 16. A plurality of strikers 20 are projectively provided on both inner walls of the automobile body along the the circumference of a circle centered at the pivotal shaft 14. The lock unit 18 locks the back rest 16 in a position corresponding to any of the strikers 20 with which the lock unit 18 is engaged. To this end, the strikers 20 are spatially arranged, as shown in FIG. 1, on a locus 24 traced by a point of engagement between the lock unit 18 and striker 20 which is shifted according to the degree to which the back rest 16 is inclined. Since the lock units 18 and strikers 20 provided on both inner walls of the automobile body have a symmetric construction and perform the same action, FIGS. 1 and 2 indicate those fitted to only one side of the automobile body, the following description being limited thereto.

Figure 3:
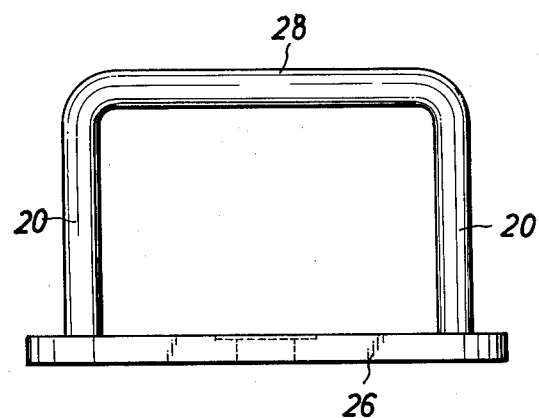
FIG. 3 is a front view of each assembly of strikers fitted to a base plate.
Figure 4:
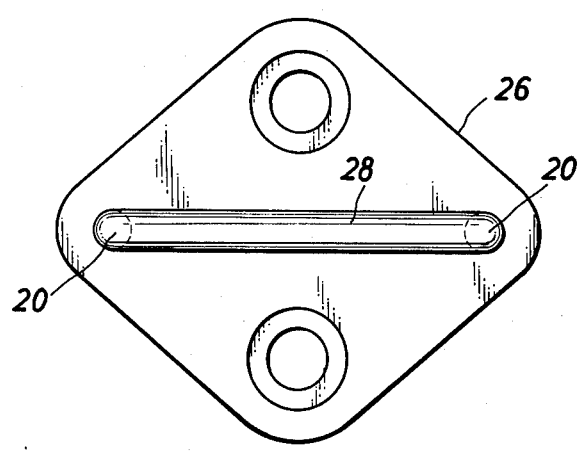
FIG. 4 is a plan view of the assembled strikers of FIG. 3.

As seen from FIGS. 3 and 4, an assembly of strikers 20 is erected on a base plate 26 admitting of easy attachment to the automobile body. The ends of the assembled strikers 20 are joined together by a connector 28 to elevate safety and mechanical strength.

A character A of FIG. 1 denotes a normal position of the back rest 16, a character B an upright position thereof, and a character C a forward-thrown position thereof. The paired lock units 18 are connected by a control rod 30 positioned behind the back rest 16. The lock unit 18 is unlocked from the striker 20 by rotating a handle 32 fitted to the center of the control rod 30. Under this condition, the back rest 16 is freely swingable back and forth, ready to the shifted to another inclined position.

A case 34 of the lock unit 18 is formed of a pair of covers 44, 46 comprising parallel base plates 36, 38 and lateral edge portions 40, 42 constituting the periphery of the case 34 except for the end portion thereof indicated in FIGS. 5 and 6. The covers 44, 46 are joined at the upper end and reinforced by a plurality of spatially arranged support rods 48. The case 34 has an opening 50 provided at the indicated lower end, that is, on that side of the case 34 which faces the pivotal shaft 14 of the rear seat (FIG. 1). Referential numeral 52 denotes through holes for fitting the case 34 or lock unit 18 to the back rest 16. A pivotal shaft 54 extending across the case 34 is fitted to the cover base plates 36, 38 at a point rear the opening 50. A substantially disk-like rotatable actuating unit 58 is bored with a plurality of radially extending elongate grooves 56 equidistantly arranged in a circumferential direction. A star-shaped member 60 belonging to a direction-setting unit is fitted to the rotatable actuating unit 58. Both actuating unit 58 and star-shaped member 60 are rotatably fitted about the peripheral wall of the pivotal shaft 54. With the foregoing embodiment, four elongate grooves are bored in the disk-like rotatable actuating unit 58. Bisectors of every two adjacent elongate grooves 56 define an angle of 90° with the pivotal shaft 14. Every two adjacent elongate grooves 56 provide a segmental portion 62. A shallow depression 64 is formed on the outer edge of the periphery of each segmental portion 62. The star-shaped member 60 comprises four substantially triangular projections 66 arranged at points circumferentially spaced from each other at an angle of 90°. A V-shaped root portion 68 is defined between the respective adjacent triangular projections 66 with the apices of said root portions 68 directed toward the pivotal shaft 54. The joining of the disk-like rotatable actuating unit 58 and star-shaped member 60 is effected by inserting four pins 70 into four holes 72 (FIG. 6) bored through the disk-like rotatable actuating unit 58 and star-shaped member 60 with the central line of each segmental portion 62 and that of each corresponding projection 66 substantially aligned with each other.

A plate spring 74 constituting a direction-setting unit together with the star-shaped member 60 has one end fixed to the lateral edge 42 by a rivet 76. The other free end portion 80 of the plate spring 74 bent into a V-shaped 78 is pressed against the periphery of the star-shaped member 60. Where the back rest 16 is swung, the striker 20 is engaged with any of the elongate grooves 56 of the rotatable actuating unit 58 to rotate said actuating unit 58. While, however, the striker 20 remains disengaged from the elongate groove 56, the actuating unit 58 is rotated by the force of the plate spring 74, and brought to rest when the V-shaped bent portion 80 of the plate spring 74 is pressed against the bottom of the V-shaped root portion 68 of the star-shaped member 60. The above-mentioned rest position of the actuating unit 58 represents a free point at which said actuating unit 58 remains disengaged from the striker 20. Where the rotatable actuating unit 58 is left free and the back rest 16 is made swingable, then any of the strikers 20 is drawn near to the lock unit 18 from the left or right side of FIG. 5 along the locus 24 traced by the point of engagement between the lock unit 18 and striker 20, and easily engaged with one of the two elongate grooves lying outside of the opening 50 of the case 34, thereby locking the back rest 16.

A pivotal shaft 82, both ends of which are fixed to the cover base plates 36, 38 comprises a larger diameter section 84 and a smaller diameter section 86. A latch 88 included in the lock unit 18 is rotatably fitted about the peripheral wall of the smaller diameter section 86 of the pivotal shaft 82. A coil spring 90 included in the lock unit 18 is loosely fitted about the peripheral wall of the larger diameter section 84. The free end of the latch 88 is formed into an engagement section 92 protruding toward the rotatable actuating unit 58 to be pressed against the periphery thereof. Where any of the elongate grooves 56 is brought in front of the engagement section 92 of the latch 88 by the rotation of the actuating unit 58, then the latch 88 is engaged with the elongate groove 56 to stop the rotation of the actuating unit 58. The engagement section 92 of the latch 88 is bored with a through hole 94, into which a pin 98 projectively provided at one end of a connector 96 belonging to a releasing mechanism is rotatably inserted.

A sleeve 100 belonging to a shifting means 99 included in a releasing mechanism is pivotally supported by the cover base plates 36, 38 on the opposite side of the case 34 to that on which the opening 50 is provided. The sleeve 100 has three arms 102, 104, 106 as shown in FIG. 5. The end of the arm 102 is bored with an arcuate elongate hole 108, into which a pin 110 projectively provided at the end of the connector 96 is slidably inserted. The arm 104 is engaged with one end of a coil spring 112 loosely fitted about the peripheral wall of the sleeve 100, the other end of said coil spring 12 being pressed against the inner wall of the upper part of the lateral edge portion of the cover 46. The sleeve 100 is urged clockwise of FIG. 5 by the coil spring 112 to be rotated, until the arm 106 abuts against the lateral edge portion 40. A shaft (not shown) formed with a rectangular cross section at the end of the control rod 30 is inserted into a hole bored through the sleeve 100 similarly with a rectangular cross section. The sleeve 100 is rotated by the turn of the control rod 30.

There will now be described the action of the striker 20 and lock unit 18. While the striker 20 remains disengaged, as shown in FIG. 5, from the rotatable actuating unit 58 of the lock unit 18, then the actuating unit 58 is rotated by the force of the plate spring 74 to be set at a free position. Referential numeral 24 of FIG. 1 denotes a locus traced by a point of engagement between the lock unit 18 and any of the strikers 20 which is shifted according to the degree to which the back rest of a rear seat is inclined forward or backward the actuating unit 58 occupying a free position stands at rest at a point where the opening of one of the two elongate grooves 56 bored on both sides of the segmental section 62 projecting from the opening 50 of the case 34 is ready to receive the striker drawn near to said groove 56 along the above-defined locus 24.

Figure 7:
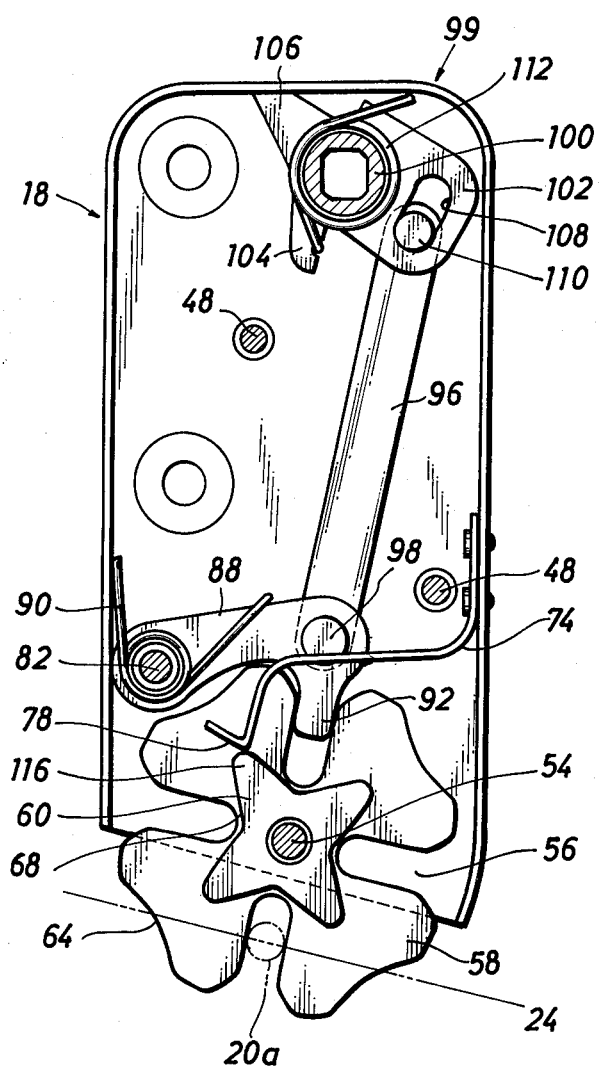
FIG. 7 is a front view showing the lock unit of FIG. 5 locked with any of the strikers.
Figure 8:
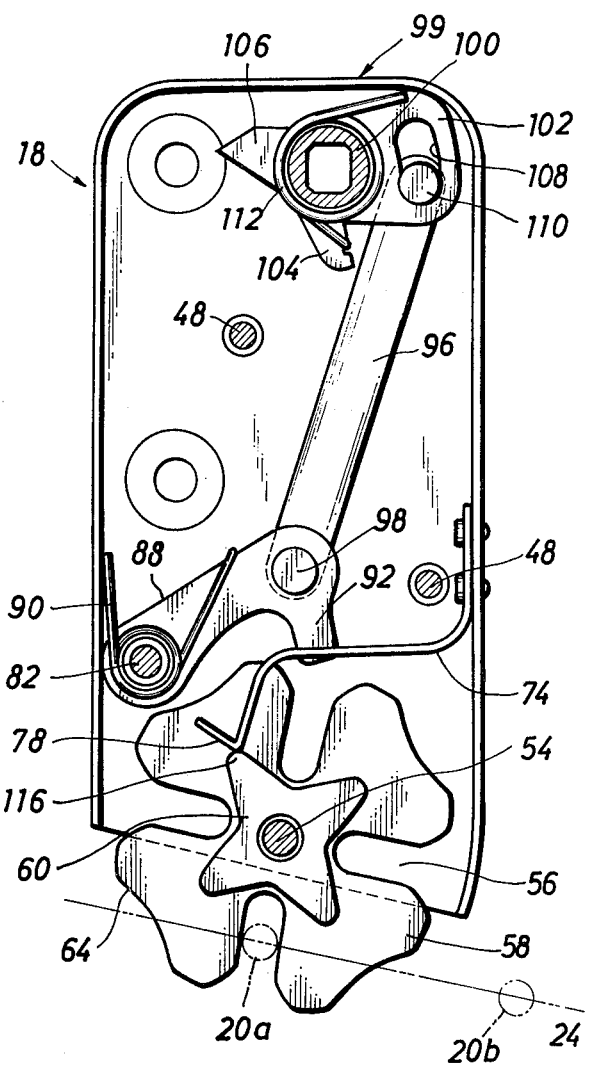
FIG. 8 is a front view showing the lock unit of FIG. 7 unlocked by the action of a releasing mechanism.

The left side of FIGS. 5, 7 and 8 is taken to represent the forward side of, for example, a light van type automobile. FIG. 5 shows the case where the back rest 16 is thrown forward (FIG. 1), and the striker 20 is just about to contact the lateral wall of the segmental section 62. Where the back rest 16 is further thrown forward, the striker 20 is shifted to the right along the locus 24 to turn the rotating actuating unit 58 counterclockwise. Where the striker 20 reaches the position of the striker 20a of FIG. 7 and the actuating unit 58 is further rotated up to a position in which the striker 20 is engaged with the elongate groove in the deepest position, namely, a position of full engagement (this position of full engagement is reached when the actuating unit 58 is rotated, as shown in FIG. 7, through an angle of 45° from the position indicated in FIG. 5 to that of FIG. 7), then the engagement section 92 of the latch 88 is inserted by the force of the coil spring 90 into an elongate groove 56 circumferentially spaced 180° from another elongate groove 56 into which the striker 20a is inserted. As the result, the lock unit 18 or back rest 16 is locked in a position determined by the striker 20a, for example, an upright position B. The above-mentioned position of full engagement corresponds to the previously described lock position of the actuating unit 58. Under the above-mentioned condition, the V-shaped bent portion 80 of the plate spring 74 is pushed up to the apex 116 of any of the triangular projections 66 of the star-shaped member 60 to be pressed against that portion of the triangular projection 66 which lies slightly beyond the apex 116 (FIG. 7). Accordingly, the star-shapd member 60 or actuating unit 58 is urged counterclockwise.

Where the lock unit 18 is locked by the striker 20, then the pin 110 fitted to the upper end of the connector 96 is shifted, as shown in FIG. 7, by the clockwise rotation of the latch 88 to the lower end of the arcuate elongate hole 108. Where, therefore, the sleeve 100 is rotated by operation of the handle 32 (FIG. 2) until the arm 102 touches the inner wall of the upper part of the lateral edge 40 of the cover 44, then the engagement section 92 of the latch 88 is withdrawn from the elongate groove 56 to unlock the lock unit 18, enabling the back rest 16 to be swung again about the pivotal shaft 14. Where the back rest 16 is further thrown forward, and the striker 20a is shifted to the position of a striker 20b of FIG. 8 remote from the actuating unit 58, then the plate spring 74 pushes the triangular projection 66 to the left to rotate the star-shaped member 60, or the actuating unit 58 counterclockwise up to an adjacent free position spaced about 90° in the circumferential direction from the free position of FIG. 5.

As apparent from the foregoing description and FIGS. 5 to 8, the actuating unit 58 is brought to a free position, each time it is rotated through an angle of 90°. Namely, the actuating unit 58 is rotated through an angle of 90°, each time one of the strikers 20 passes the lock unit 18 to be set in the succeeding free position. Repetition of the above-mentioned operation enables the back rest 16 of the rear seat to be easily shifted to the forward thrown position of FIG. 1.

Where the back rest 16 is pulled up, the actuating unit 58 and star-shaped member 60 are rotated in the opposite direction to that of the previous case, with the other operation carried out in the same manner as described above, thereby allowing the back rest 16 to be set in an inclined position corresponding to a desired striker 20, for example, the upright position B or normal position A. The back rest 16 can be rotated at once through a large angle, for example from the position A to the position C or vice versa by operating the handle 32.

Figure 9:
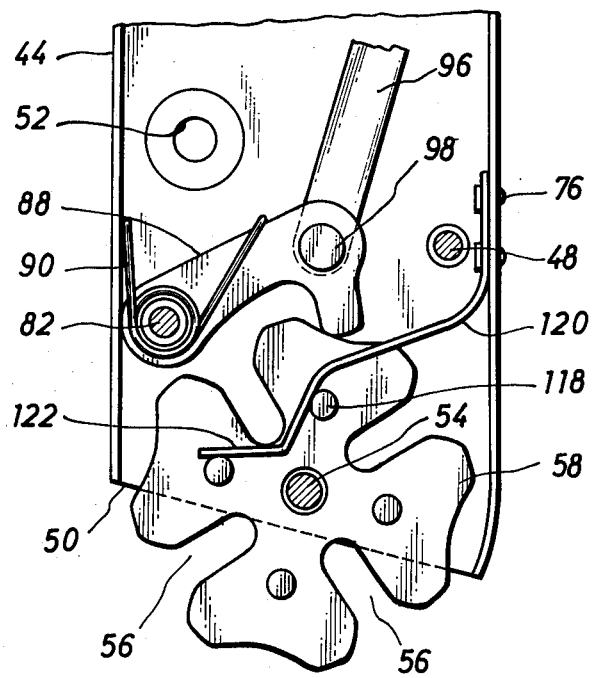
FIG. 9 is a front view showing a rotatable actuating unit according to a second embodiment of the invention which is included in the lock unit.

FIG. 9 representing a second embodiment of this invention modified from the first embodiment thereof mainly indicates a different arrangement from the first embodiment. The parts of FIG. 9 corresponding to those of FIGS. 5 to 8 are respectively denoted by the same numeral. With the second embodiment of FIG. 9, four segmental sections 62 of the rotatable actuating unit 58 are fitted with four direction-setting pins 118 which are arranged on the circumference of a circle centered at the pivotal shaft 54 equidistantly in the circumferential direction, namely, spaced from each other at an angle of 90°. the V-shaped bent portion 122 of a plate spring 120 corresponding to the previously described plate spring 74 is pressed against two adjacent direction-setting pins 118, thereby causing the rotatable actuating unit 58 to be set in a position rotated in a prescribed direction, while the striker 20 remains disengaged from any of the elongate grooves 56. In this case, the fitting of the plate spring 120 and the position and shape of the free end bent portion 122 thereof are so chosen as to enable the elongate groove 56 easily to receive an approaching striker 20 when the rotatable actuating unit 58 is set in a free position.

As in the preceding embodiment, the rotatable actuating unit 58 of the second embodiment of FIG. 9 can be set in one free position, each time said unit 58 is rotated through an angle of 90°, namely, in four free positions in total. Where the striker 20 is not engaged with the elongate groove 56, then the rotatable actuating unit 58 is rotated to any of the four free positions to be set therein.

While the foregoing description relates to a seat lock device according to the above-mentioned two embodiments of this invention, the following advantages are attained by the invention that the lock units and strikers which are disposed apart from the pivotal shaft of a back rest are generally subjected to a small stress, and can be made relatively compact, light and durable; and since it is possible to provide a large number of strikers, the back rest of a seat can be locked in an inclined position in a large number of stages.

What we claim is:

1. A seat lock device comprising a lock unit fitted on one member of an immovable member and a swingable back rest member of a seat, the back rest member being rotatably supported by a pivotal shaft mounted on the immovable member and at a point spaced from the pivotal shaft, and a plurality of strikers mounted on the other of said members along the circumference of a circle centered at the pivotal shaft for lockable engagement with the lock unit, wherein the lock unit comprises a case; an actuating unit pivotally supported on the case to be rotated into selective engagement with any of the strikers; a lock mechanism for locking the rotatable actuating unit when it is rotated through a prescribed angle to a lock position; a direction-setting unit for rotating the actuating unit to set it in a free position ready for engagement with an approaching striker while the actuating unit remains disengaged from all the strikers; and a releasing mechanism for releasing the actuating unit locked by the lock mechanism.

2. The seat lock device according to claim 1, wherein the rotatable actuating unit is provided with a plurality of elongate grooves, for selective engagement with any of the strikers, radially cut out and disposed at points defined by equally dividing the circumference of said rotatable actuating unit.

3. The seat lock device according to claim 2, wherein the lock mechanism comprises a latch engageable with an elongate groove other than the groove in engagement with the striker; and elastic means for urging the latch toward the rotatable actuating unit.

4. The seat lock device according to claim 3, wherein the direction-setting unit comprises a star-shaped member concentrically fitted to the rotatable actuating unit and provided with a plurality of radially extending triangular projections substantially equally spaced circumferentially from each other, with a root portion formed between every two adjacent triangular projections; and elastic means for urging the star-shaped member, and, while all the strikers remain disengaged from the rotatable actuating unit, rotating said actuating unit to set it in a position in which the free end of an elastic means is engaged with a root portion.

5. The seat lock device according to claim 3, wherein the direction-setting unit comprises a plurality of pins corresponding in number to the number of elongate grooves, said pins projecting axially of the rotatable actuating unit from one side thereof, each pin being located between a pair of adjacent grooves, the pins being substantially equally spaced from each other; and a plate spring, one end of which is fixed to the case, the other end of which is bent into a V-shape to be pressed against two adjacent pins, and which rotates the actuating unit to set it in a position in which the V-shaped bent portion of the plate spring is stably engaged with two adjacent pins.

6. The seat lock device according to claim 3, wherein the rotatable actuating unit is rotatable through a prescribed angle in either direction.

* * * * *